US008078833B2

(12) United States Patent
Wang et al.

(10) Patent No.: US 8,078,833 B2
(45) Date of Patent: Dec. 13, 2011

(54) MICROPROCESSOR WITH HIGHLY CONFIGURABLE PIPELINE AND EXECUTIONAL UNIT INTERNAL HIERARCHAL STRUCTURES, OPTIMIZABLE FOR DIFFERENT TYPES OF COMPUTATIONAL FUNCTIONS

(75) Inventors: Xiaolin Wang, Concord, MA (US); Qian Wu, San Jose, CA (US); Benjamin Marshall, Stow, MA (US); Fugui Wang, Sterling, MA (US); Ke Ning, Framingham, MA (US); Gregory Pitarys, Stow, MA (US)

(73) Assignee: Axis Semiconductor, Inc., Boxborough, MA (US)

( * ) Notice: Subject to any disclaimer, the term of this patent is extended or adjusted under 35 U.S.C. 154(b) by 507 days.

(21) Appl. No.: 12/156,006

(22) Filed: May 29, 2008

(65) Prior Publication Data

US 2009/0300336 A1    Dec. 3, 2009

(51) Int. Cl.
G06F 15/00 (2006.01)
G06F 15/76 (2006.01)
(52) U.S. Cl. .......................... 712/15; 712/229
(58) Field of Classification Search .......... 712/15
See application file for complete search history.

(56) References Cited

U.S. PATENT DOCUMENTS

| 5,212,777 | A | 5/1993 | Gove et al. |
| 5,226,125 | A | 7/1993 | Balmer et al. |
| 5,239,654 | A | 8/1993 | Ing-Simmons et al. |
| 5,471,592 | A | 11/1995 | Gove et al. |
| 5,471,626 | A | 11/1995 | Carnevale |
| 5,706,459 | A | 1/1998 | Atsushi |
| 5,784,636 | A * | 7/1998 | Rupp .................. 712/37 |
| 5,887,160 | A | 3/1999 | Lauritzen |
| 5,937,203 | A | 8/1999 | Lee |
| 6,023,753 | A | 2/2000 | Pechanek et al. |
| 6,052,773 | A | 4/2000 | DeHon |
| 6,070,003 | A | 5/2000 | Gove et al. |
| 6,151,668 | A | 11/2000 | Pechanek et al. |
| 6,173,389 | B1 | 1/2001 | Pechanek et al. |
| 6,216,223 | B1 | 4/2001 | Revilla et al. |

(Continued)

FOREIGN PATENT DOCUMENTS

EP    0284364 A    9/1988

(Continued)

OTHER PUBLICATIONS

Michael Taylor et. al., The Raw Processor: A Composeable 32-Bit Fabric for Embedded and General Purpose Computing, MIT Laboratory for Computer Science, Proceedings of Hotchips Aug. 13, 2001, 4 pages.

(Continued)

Primary Examiner — Corey S Faherty
(74) Attorney, Agent, or Firm — Vern Maine & Associates

(57) ABSTRACT

The invention resides in a flexible data pipeline structure for accommodating software computational instructions for varying application programs and having a programmable embedded processor with internal pipeline stages the order and length of which varies as fast as every clock cycle based on the instruction sequence in an application program preloaded into the processor, and wherein the processor includes a data switch matrix selectively and flexibly interconnecting pluralities of mathematical execution units and memory units in response to said instructions, and wherein the execution units are configurable to perform operations at different precisions of multi-bit arithmetic and logic operations and in a multi-level hierarchical architecture structure.

24 Claims, 13 Drawing Sheets

U.S. PATENT DOCUMENTS

| | | | |
|---|---|---|---|
| 6,219,785 B1 * | 4/2001 | Smith | 713/1 |
| 6,321,322 B1 | 11/2001 | Pechanek et al. | |
| 6,446,191 B1 | 9/2002 | Pechanek et al. | |
| 6,539,438 B1 * | 3/2003 | Ledzius et al. | 710/8 |
| 6,574,764 B2 | 6/2003 | Krech, Jr. | |
| 6,851,041 B2 | 2/2005 | Pechanek et al. | |
| 6,859,873 B2 | 2/2005 | Norden | |
| 6,883,088 B1 | 4/2005 | Barry et al. | |
| 6,954,281 B2 | 10/2005 | Fukuda et al. | |
| 7,036,036 B2 * | 4/2006 | Vorbach et al. | 713/375 |
| 7,200,287 B2 | 4/2007 | Fukuda et al. | |
| 7,205,864 B2 * | 4/2007 | Schultz et al. | 333/104 |
| 7,260,707 B2 | 8/2007 | Norden | |
| 7,395,411 B2 | 7/2008 | Kasahara | |
| 7,406,588 B2 | 7/2008 | Lin | |
| 7,454,598 B2 | 11/2008 | Hastie | |
| RE41,703 E | 9/2010 | Pechanek et al. | |
| 2001/0012127 A1 | 8/2001 | Fukuda et al. | |
| 2001/0021278 A1 | 9/2001 | Fukuda et al. | |
| 2002/0162046 A1 | 10/2002 | Krech, Jr. | |
| 2002/0199085 A1 | 12/2002 | Norden | |
| 2003/0061473 A1 | 3/2003 | Revilla et al. | |
| 2003/0079109 A1 | 4/2003 | Pechanek et al. | |
| 2003/0088757 A1 | 5/2003 | Lindner | |
| 2003/0200420 A1 | 10/2003 | Pechanek et al. | |
| 2004/0019765 A1 | 1/2004 | Klein, Jr. | |
| 2004/0078548 A1 | 4/2004 | Claydon | |
| 2005/0021578 A1 | 1/2005 | Chen | |
| 2005/0076187 A1 | 4/2005 | Claydon | |
| 2005/0149699 A1 | 7/2005 | Norden | |
| 2006/0028683 A1 | 2/2006 | Fukuda et al. | |
| 2006/0253689 A1 | 11/2006 | Knowles | |
| 2006/0259741 A1 | 11/2006 | Hastie | |
| 2006/0259742 A1 | 11/2006 | Norden | |
| 2006/0259748 A1 | 11/2006 | Lin | |
| 2007/0143577 A1 | 6/2007 | Smith | |
| 2008/0301413 A1 * | 12/2008 | Wang | 712/220 |

FOREIGN PATENT DOCUMENTS

| | | |
|---|---|---|
| EP | 0569312 A2 | 11/1993 |
| EP | 1199629 A1 | 4/2002 |
| EP | 1780644 A1 | 5/2007 |
| WO | 9744728 | 11/1997 |
| WO | 03088071 A2 | 10/2003 |

OTHER PUBLICATIONS

Barat F et al, Reconfigurable instructin set processors from a hardware/software perspective, IEEE Transactions on Software Engineering, IEE Service Center, vol. 28, No. 9, Sep. 1, 2002, 16 pages.

Chen D C et al, A Reconfigurable Multiprocessor IC for Rapid Prototyping of Algorithmic-Specfiic High-Sped DSP Data Paths, IEEE Journal of Soldid-State Circuits, IEE Service Center, vol. 27, No. 12, Dec. 1, 1992, 10 pages.

Hans M Jacobson et al, Application-Specific Programmable Control for High-Performance Asynchronous Circuits, Proceedings of the IEEE, IEEE. NY, NY vol. 87, No. 2, Feb. 1, 1999, 13 pages.

PCT Search Report dated Aug. 25, 2010 of Patent Application No. PCT/IB2009/000135 filed Jan. 26, 2009.

Anirban Baso: "A Transputer Based Adaptable Pipeline" Internationl Conference on Supercomputing, Conferenceproceedings. ACM, New York, US vol. 1, May 4, 1987.

Schmit H H et al: "Pipeline Reconfigurable FPGAS" Journal of VLSI Signal Processing Systems for Signal, Image, and Video Technology, Springer, New York, NY US LNKD-DOI: 10.1023/A:1008137204598, vol. 24, No. 2/03, Mar. 1, 2000, pp. 12-145, XP000908461 ISSN:0922-5773 the whole document.

USPTO Non-Final Office Action for U.S. Appl. No. 12/156,007, dated Mar. 28, 2011, 20 pages.

USPTO Non-Final Office Action for U.S. Appl. No. 11/973,184, dated May 28, 2010, 16 pages.

USPTO Final Office Action for U.S. Appl. No. 11/973,184, dated Jan. 5, 2011, 17 pages.

* cited by examiner

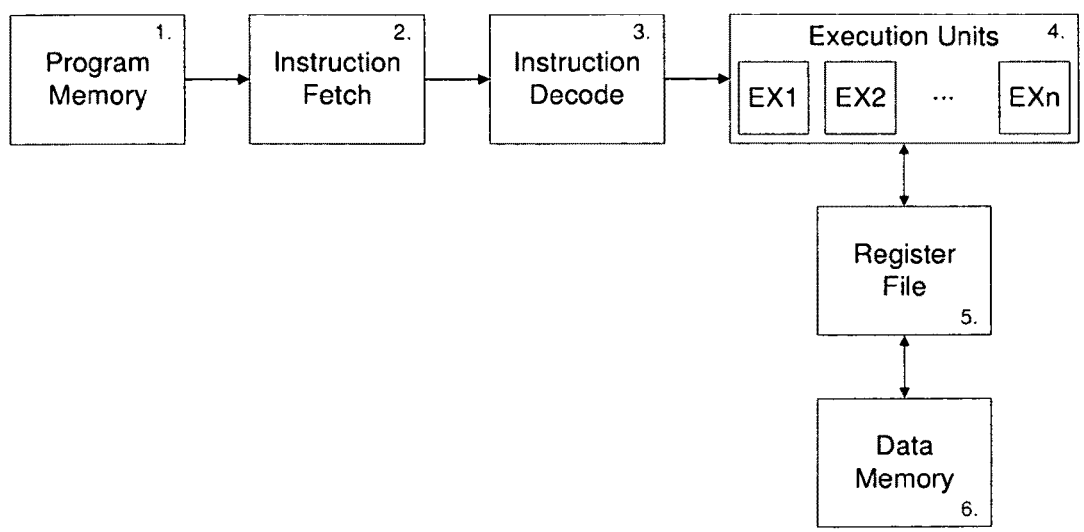
Figure 1        Prior Art

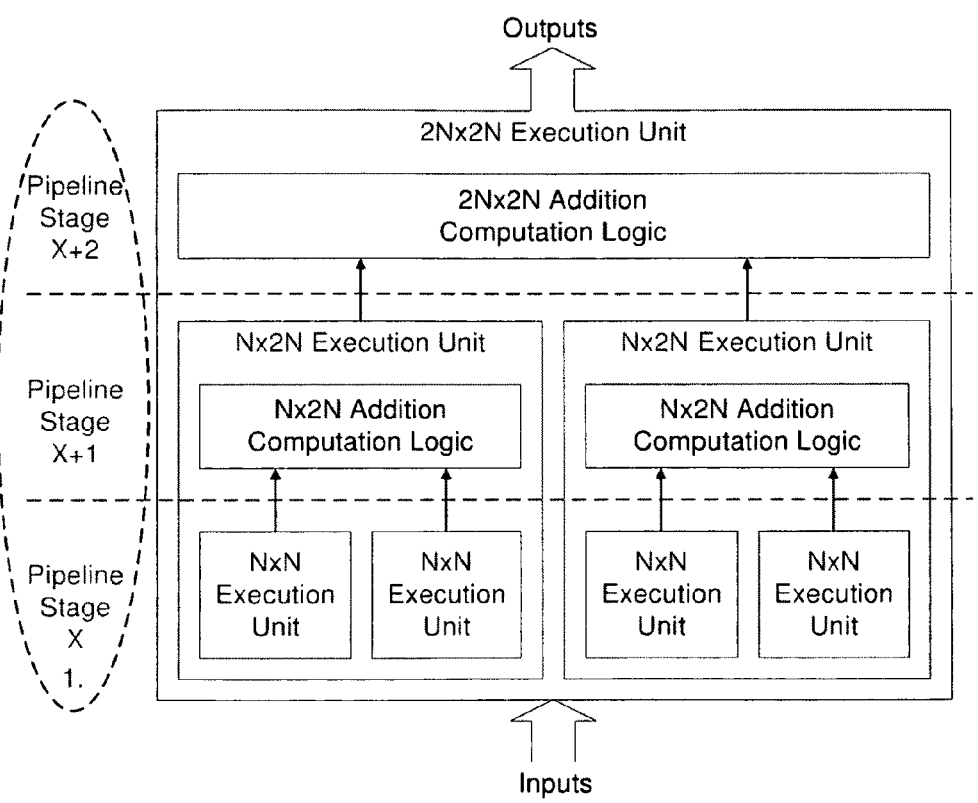
Figure 5: 3-level Implementation

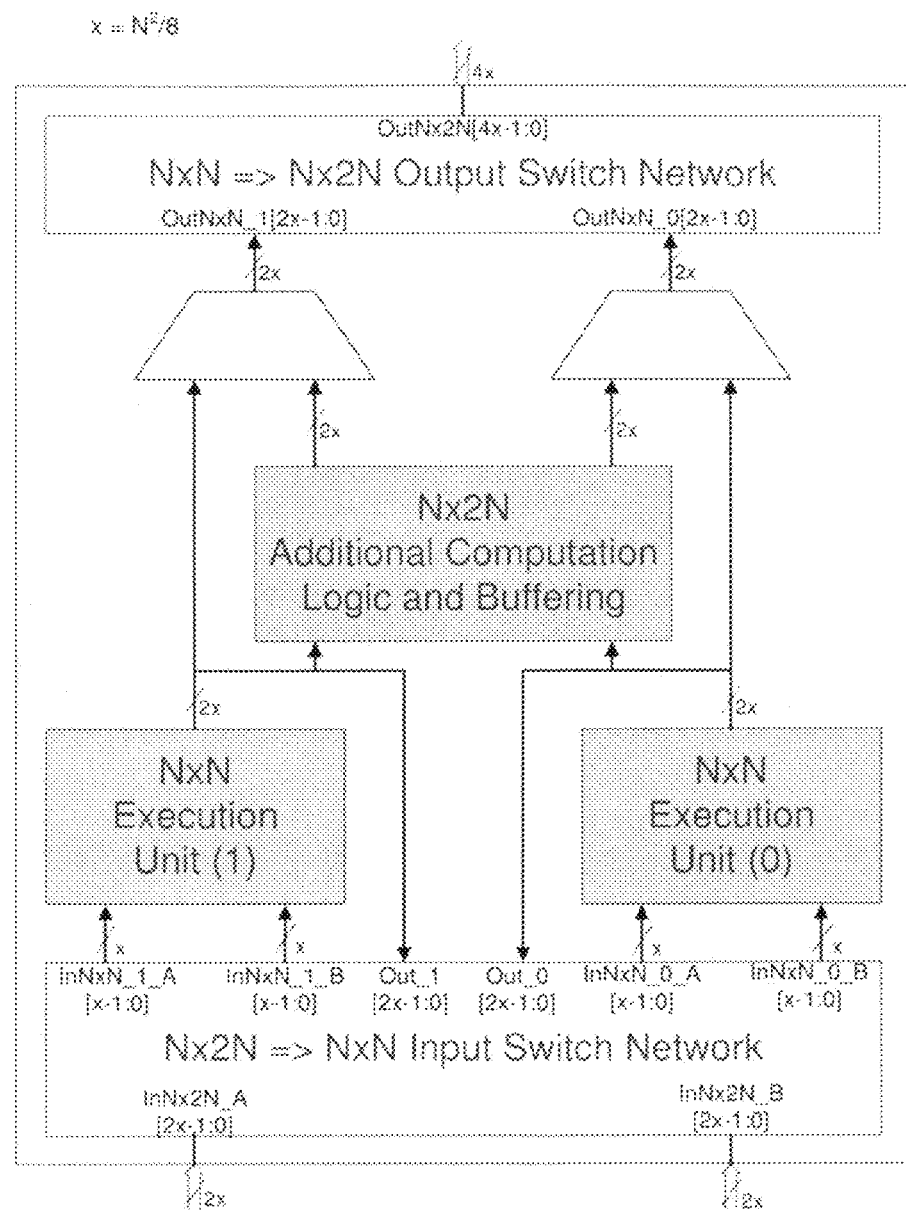
Figure 6: Connecting NxN Units to form Nx2N Units

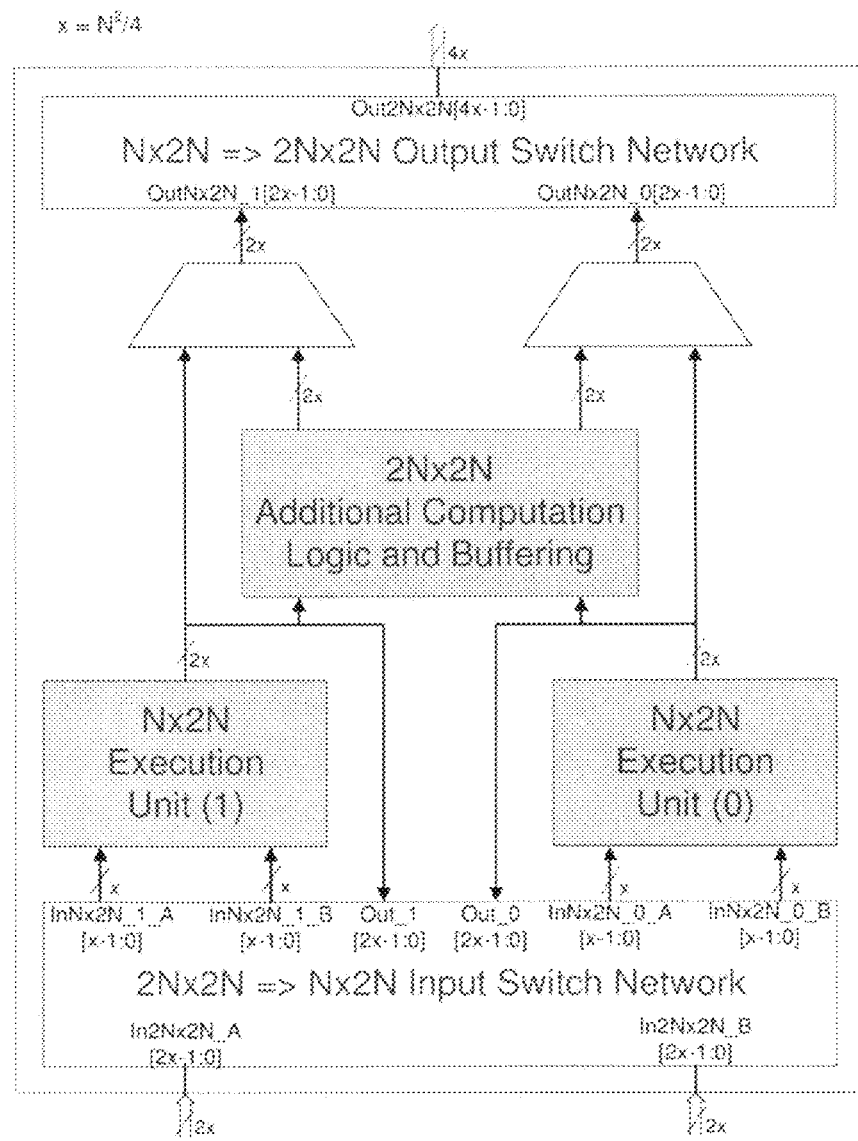
Figure 7: Connecting Nx2N Units to form 2Nx2N Units

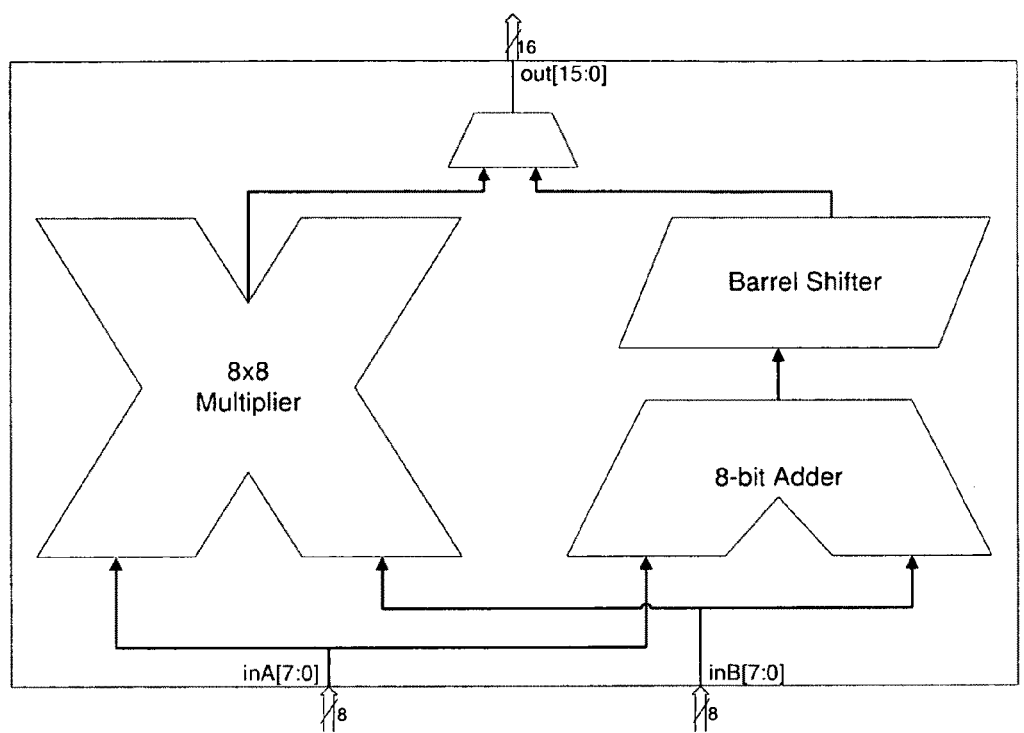
Figure 8: Structure of 8x8 ALU in Typical Present-Day Processor

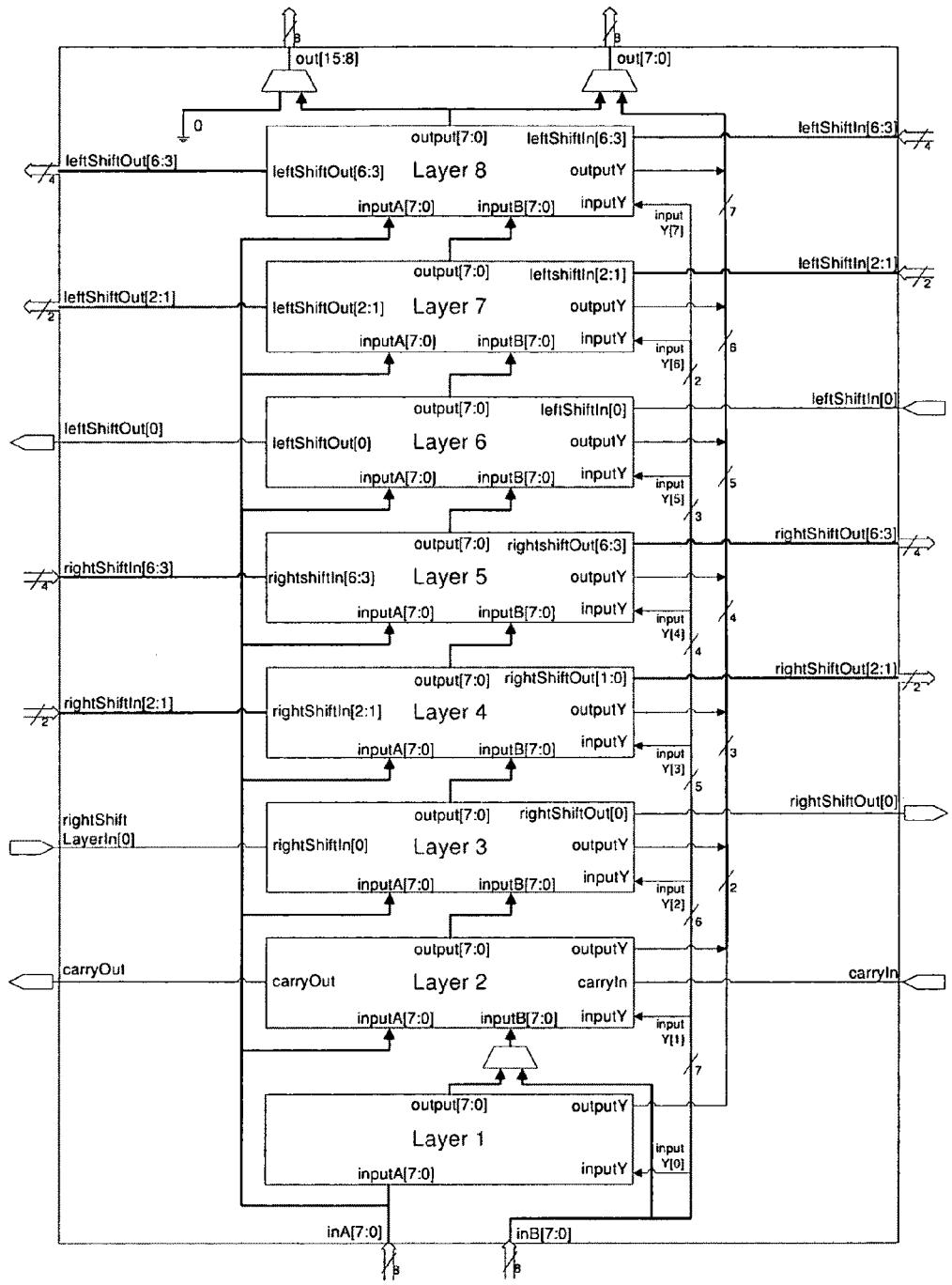
Figure 9: Structure of 8x8 ALU in Present Invention

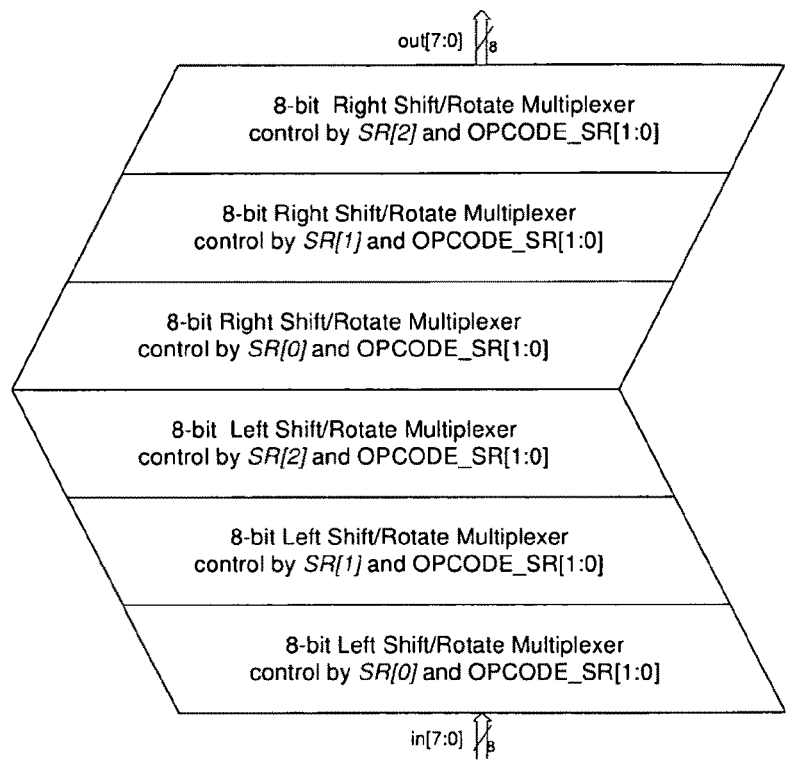
Figure 10: Traditional 8-bit Barrel Shifter with Rotate Capability
( SR[2:0] is the 3 bit word indicating 0-7 number of bits to shift
OPCODE_SR[1:0] is defined as: 00 – left shift, 01 – right shift
10 – left rotate, 11 – right rotate)

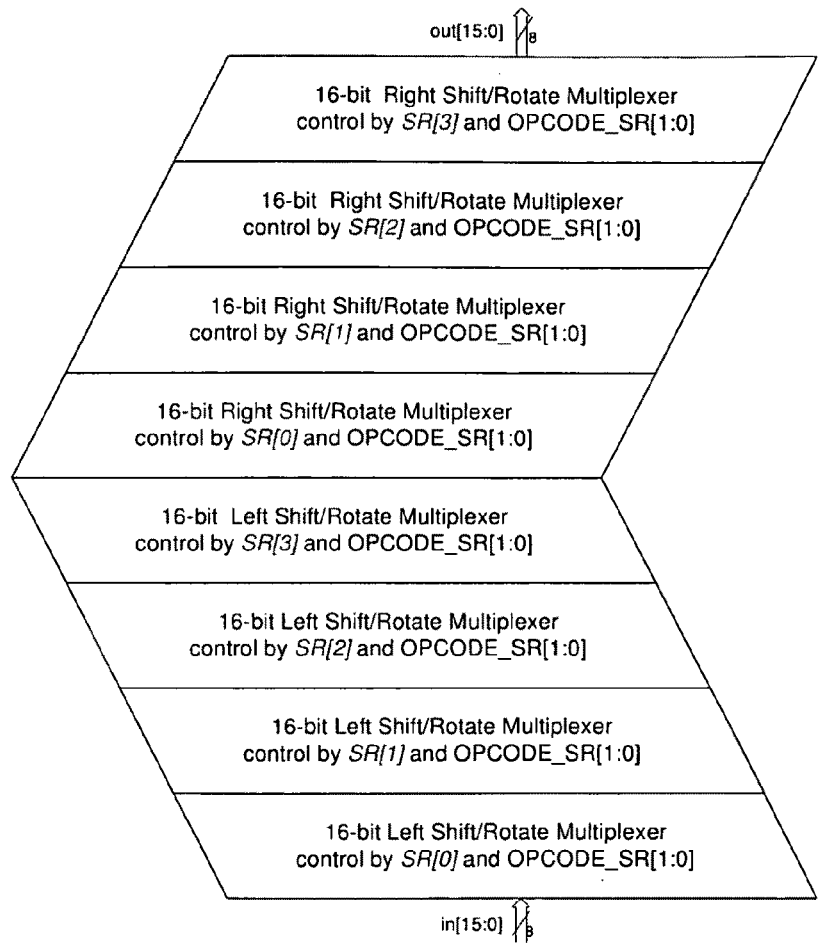
Figure 11: Traditional 16-bit Barrel Shifter with Rotate Capability
( SR[3:0] is the 4 bit word indicating 0-7 number of bits to shift
OPCODE_SR[1:0] is defined as: 00 – left shift, 01 – right shift
10 – left rotate, 11 – right rotate)

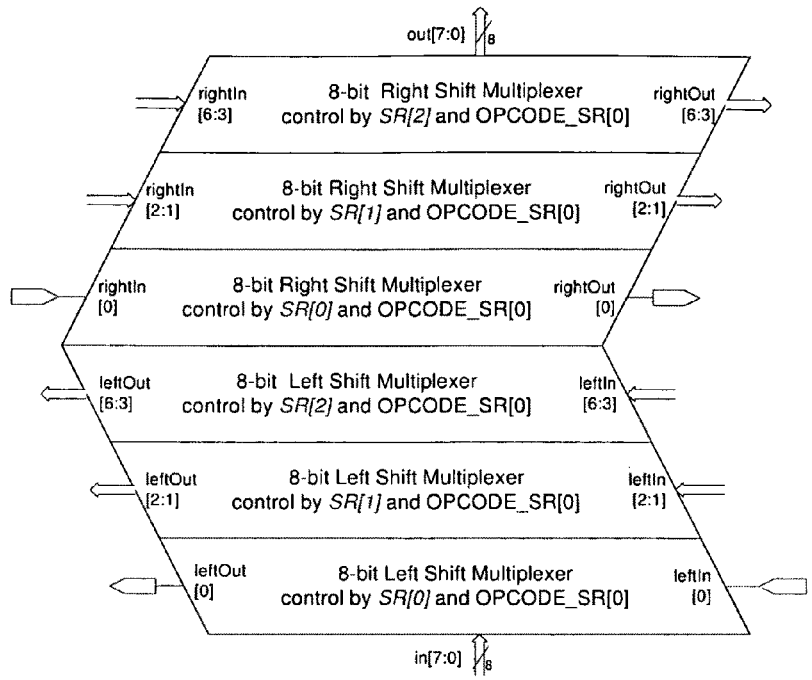
Figure 12: 8-bit Left/Right Barrel Shifter
( SR[2:0] is the 3 bit word indicating 0-7 number of bits to shift
OPCODE_SR[1:0] is defined as: 00 – left shift, 01 – right shift
10 – left rotate, 11 – right rotate)
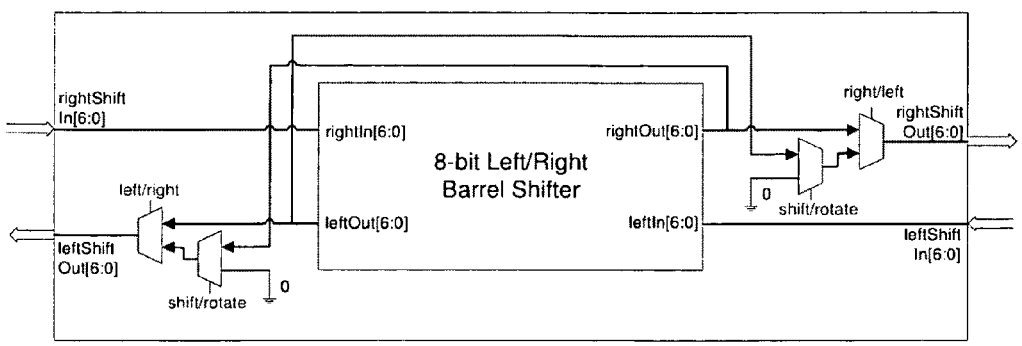
Figure 13: 8-bit Shift/Rotate Structure
(right - right shift or right rotate)

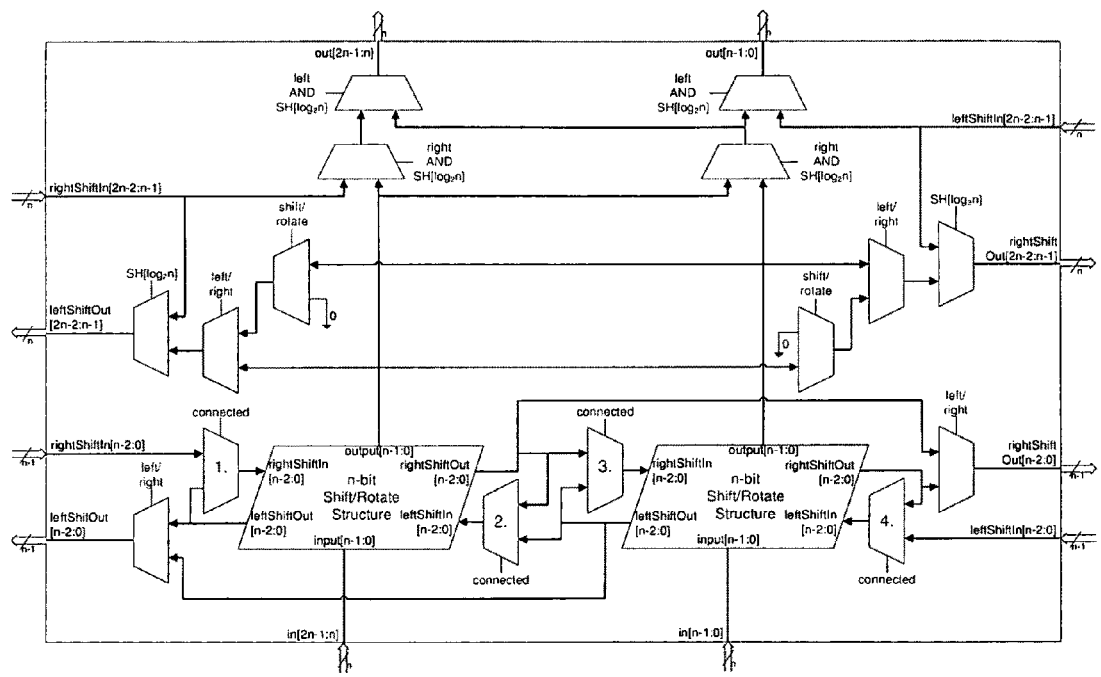
Figure 14: Connecting two n-bit Shift and Rotate Structure to form a 2n-bit Shift/Rotate Structure
(right – right shift or right rotate; left – left shift or left rotate;
shift – left shift or right shift; rotate – left rotate or right rotate;
connected – two units connected to form 2n-bit unit; SR[log2n] MSB in the word for bits to shift)

US 8,078,833 B2

MICROPROCESSOR WITH HIGHLY CONFIGURABLE PIPELINE AND EXECUTIONAL UNIT INTERNAL HIERARCHAL STRUCTURES, OPTIMIZABLE FOR DIFFERENT TYPES OF COMPUTATIONAL FUNCTIONS

FIELD OF INVENTION

The present invention relates generally to microprocessor techniques for real-time signal processing and updating, and more specifically to programmable microprocessor core operation and structures particularly, though not exclusively, suitable for real-time signal processing by switch controlled programmable processor configuring and flexible pipeline and parallel processing as described in co-pending U.S. patent application Ser. No. 11/973,184 which has been published as U.S. patent publication No. US-2008-0301413-A1, "Method Of And Apparatus And Architecture For Real Time Signal Processing By Switch-Controlled Programmable Processor Configuring and Flexible Pipeline and Parallel Processing"; the present invention being largely concerned with specific improvements in the computational execution units (EU) which the invention programs in a novel hierarchal structure to perform different arithmetic, computational and logic operations at different (multi-bit) precisions.

BACKGROUND OF INVENTION

As explained in said co-pending application, systems for converging multiple program applications into single devices (such as handset cell phones and the like), requiring a plurality of different real-time signal processing techniques and control processing capabilities to be handled in such single devices, lend themselves to the novel programmable microprocessor cores and flexible pipeline signal processing architectures of said co-pending application. These may generally be described as involving a flexible data pipeline architecture that can accommodate substantially all types of software algorithms sets of varying applications having a programmable processor with reconfigurable pipeline stages, the order and sizes of which may vary in response to the varying application instruction sequence establishing the corresponding configurations of the processor, through switching connections amongst its functional components, specifically suiting the respective and diverse applications; and wherein the functional components communicate through the switching matrix in a dynamic parallel and flexible fashion.

The present invention addresses preferred multi-level hierarchal architectures of execution units and pipeline stages containing the same.

OBJECTS OF INVENTION

An object of the present invention, therefore, is to provide a new and improved configurable microprocessor technology and structure that is not subject to the hereinafter described limitations of pipeline operations in current and prior generation microprocessors, and that is particularly suited though not exclusive to the operation of the flexible programmable data pipeline architecture of said co-pending patent application.

A further object is to provide a new and improved flexible data pipeline architecture and programmable processor with pipeline stages reconfigurable in response to varying application instruction sequences that have established corresponding configurations of the processor, and with switching connections amongst its functional components specifically to suit different types of generic operations in varying applications, and wherein the functional components communicate preferably through a switch in a novel dynamic parallel and flexible fashion, with the switch configured to each set of instructions during operation, in real-time.

Other and further objects will be explained hereinafter and are more particularly addressed in the appended claims.

DRAWINGS

The invention will now be described in connection with the accompanying drawings, FIG. 1 of which is a functional block diagram illustrating today's current prior art processor core architecture using computational stages of execution units in a fixed number of pipeline stages of fixed data width (i.e. precision), shown in the examples of FIGS. 2A, 2B and 2C.

FIG. 5 illustrates the multi-level (here shown as 3-level) implementations of the execution units of the invention;

FIGS. 6 and 7 are block and circuit diagrams illustrating, respectively, the connections of N×N execution units to form N×2N units, and connecting the latter to form 2N×2N units;

FIG. 8 is a diagram illustrating the structures of an 8×8 ALU in a typical present-day processor, as contrasted with that of an 8×8 ALU in accordance with the present invention as shown in FIG. 9;

Figure 2A:
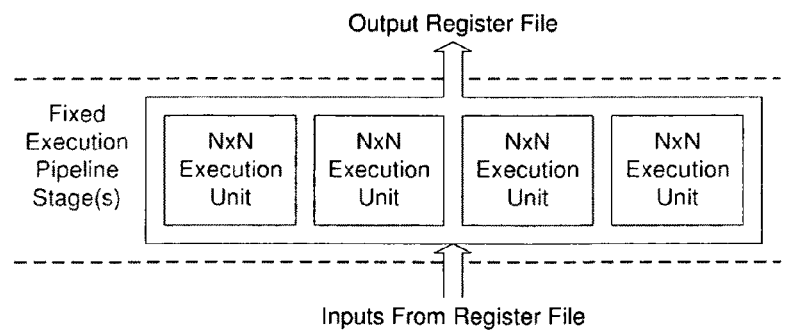

FIG. 10, illustrates traditional 8-bit barrel shifter with rotate capability, (SR [2.0] is the 3 bit word indicating 0-7 number of bits to shift OPCODE_SR[1:0] is defined as: 00-left shift, 01-right shift 10-left rotate, 11-right rotate); and as contrasted with the present invention of 8-bit shift/rotate structure as shown in FIGS. 12 and 13;

FIG. 11, illustrates traditional 16-bit barrel shifter with rotate capability, (SR[3:0] is the 4 bit word indicating 0-7 number of bits to shift OPCODE_SR[1:0] is defined as: 00-left shift, 01-right shift 10-left rotate, 11-right rotate); and as contrasted with the present invention of 8-bit shift/rotate structure as shown in FIGS. 12 and 13;

FIG. 12, illustrates traditional 8-bit barrel shifter, (SR[2.0] is the 3 bit word indicating 0-7 number of bits to shift OPCODE_SR[1:0] is defined as: 00-left shift, 01-right shift 10-left rotate, 11-right rotate); and as contrasted with the present invention of 8-bit shift/rotate structure as shown in FIG. 13;

FIG. 13, illustrates traditional 8-bit barrel shifter with rotate capability, (SR[2.)] is the 3 bit word indicating 0-7 number of bits to shift OPCODE_SR[1:0] is defined as: 00-left shift, 01-right shift 10-left rotate, 11-right rotate); and FIG. 14, is a diagram showing the connecting of two n-bit shift and rotate structures to form a 2n-bit shift/rotate structure of the invention; (right-right shift or right rotate; left-left shift or left rotate; shift-left shift or right shift; rotate-left rotate or right rotate; connected-two units connected for form 2n-bit unit; SF[log 2n] MSB in the word for bits to shift).

SUMMARY

From its broad novel core microprocessor point of view, the invention is a flexible data pipeline structure for accommodating software computational instructions for varying program applications and having a programmable embedded processor with reconfigurable pipeline stages the order and length of which varies in response to varying program application instructions, the processor including a data switch matrix selectively and flexibly interconnecting pluralities of mathematical execution units and memory units in response to said instructions and wherein the execution units are programmable to perform operations at different precisions of multi-bit arithmetic and logic circuit operations and in a multi-level hierarchical architecture structure.

From the viewpoint of the overall programmable processor and flexible pipeline system overall architecture, the invention embraces a processor structure wherein the mathematical execution units are configured each clock cycle to perform 8-bit, 16-bit, and/or 32-bit arithmetic and logic circuit operations, and depending on the operation being performed, the logic circuits inside the execution units are programmed either to be broken into independent units to perform parallel operations, or to be arranged as connected units to perform serial operations, or to be combined into larger unit(s) to perform larger operation in the hierarchical structure.

Preferred designs and best mode embodiments of the invention are hereinafter detailed.

PREFERRED EMBODIMENT(S) OF THE PRESENT INVENTION

Figure 2B:
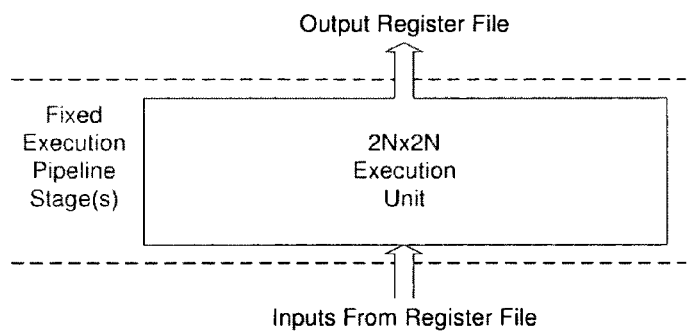
Figure 2C:
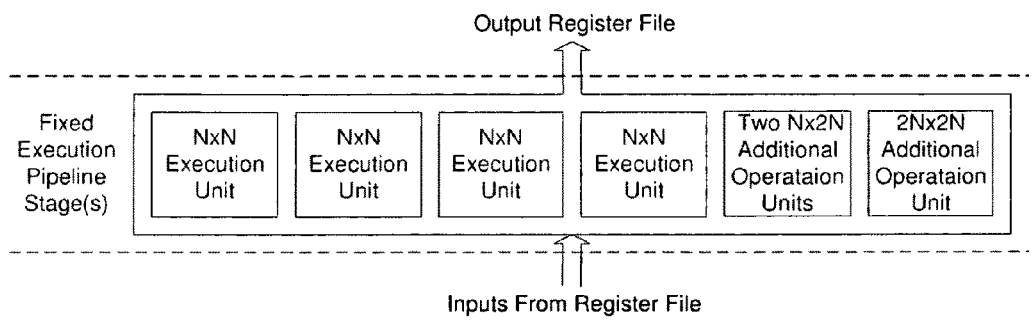

An example of the earlier described typical prior art and currently used existing processor architecture is shown in FIG. 1, using fixed pipeline stages and fixed data width (i.e. precision). Three typical computation stage examples used therein are illustrated in respective FIGS. 2(A), 2(B) and 2(C).

Figure 3:
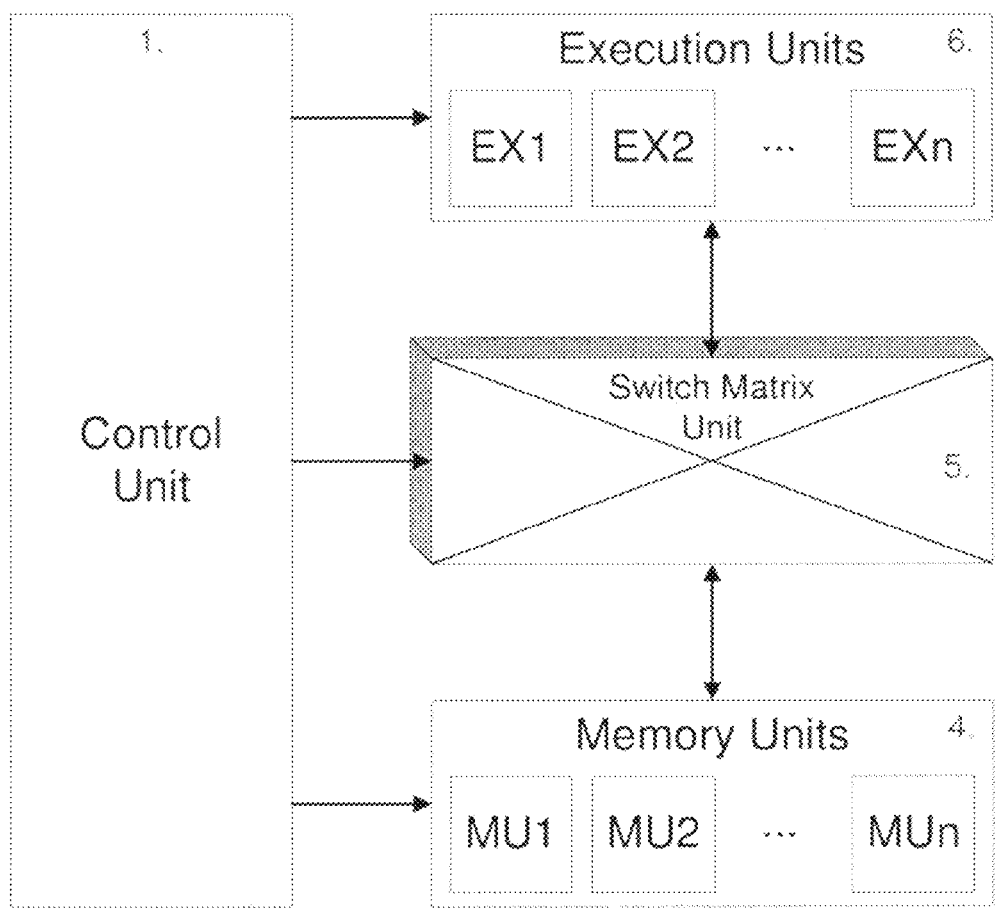
FIG. 3 is a diagram of generic core architecture with configurable data pipeline of variable width, length and shape based upon application program variations, as described in said copending patent application.
Figure 4:
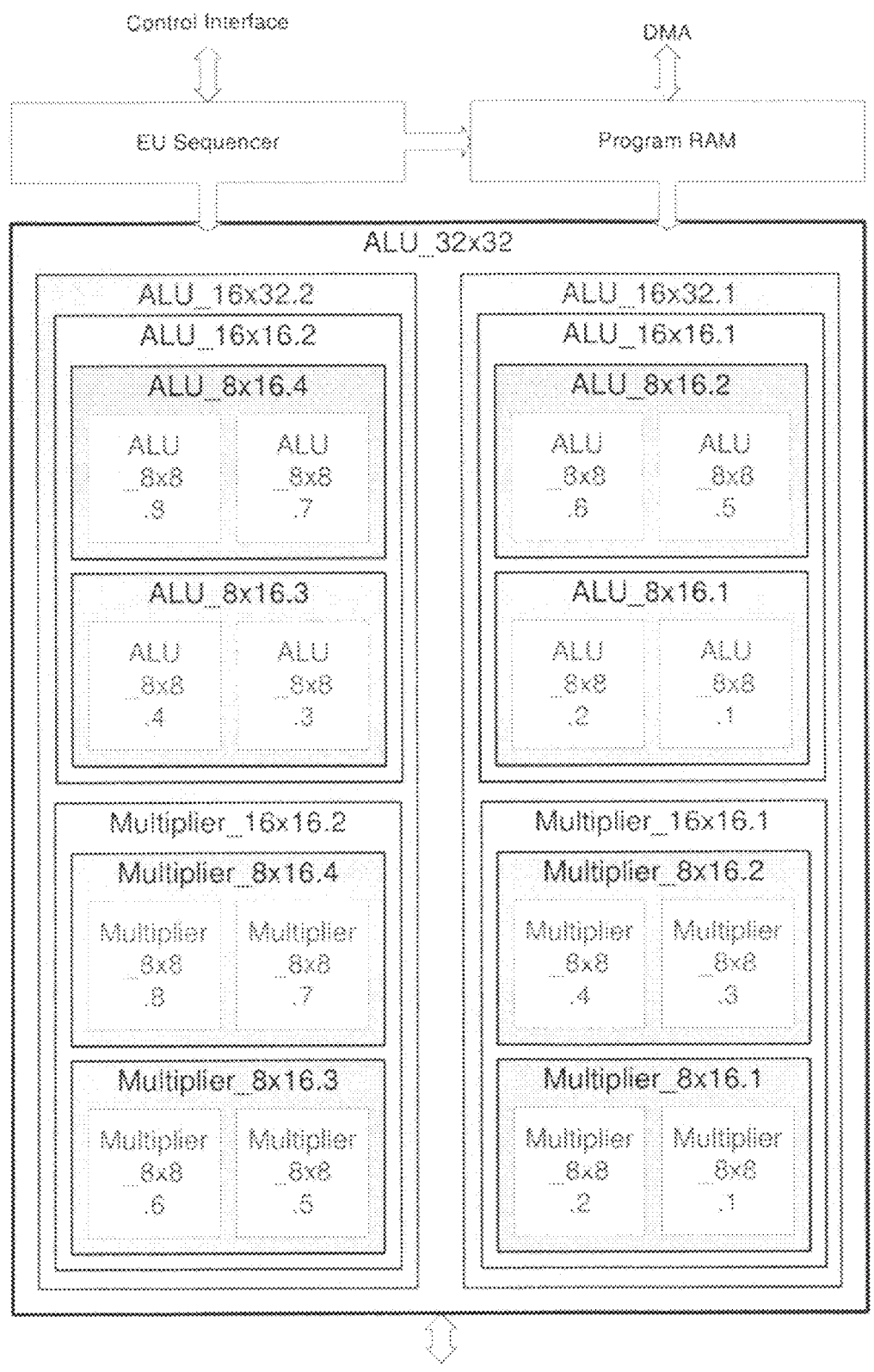
FIG. 4 is a block outline diagram of the novel hierarchical execution unit concept of the present invention.

Referring to previously mentioned FIG. 3, there is there-shown the same general system as is illustrated in FIG. 4 of said co-pending application, embodying a processor with a flexible data pipeline of variable length, width and shape formed with the execution units (EU, 6 in FIG. 3), memory units (MU, 4 in FIG. 3), and switch matrix unit (5 in FIG. 3) and a control unit (1 in FIG. 3) to manage the control mechanism of the data pipeline.

The processor core architecture described in said co-pending application and used in the present invention for these purposes, has a highly configurable internal structure that may be optimized for the different types of computational needs involved. They comprise a configurable number of pipeline stages and interconnects between the different pipeline stages, configurable computational execution units (EU) that can be set up to perform different types of computation, both sequentially and parallelly, configurable interconnections between memory units (MU) and the execution units (EU) through the switch matrix unit, where the configurable memory units are set up to provide different methods of accessing data in the memory banks. The processor core taught in said co-pending application and herein, basically consists of three components; namely, the above-mentioned execution units (EU, 2 in FIG. 3), memory units (MU, 4 in FIG. 4), and a switch matrix unit (3 in FIG. 3) where flexible interconnection is provided from the memory units to execution units to achieve the novel flexible processor core architecture.

The present invention is primarily concerned with such architectures of execution units EU, which is made highly configurable, unlike present-day current microprocessors. It can be configured to perform 8-bit, 16-bit, or 32-bit arithmetic and logic operations, and depending on the operation being performed, the logic circuits inside the execution unit can either be broken into independent units to perform parallel operations, or to be arranged as connected units to perform serial operations, or to be combined into larger units to perform larger computational operations. In accordance with the present invention, these logic circuits of the execution units are constructed in a hierarchal structure, subject to hardware availability and input/output constraints. The execution units of the invention can be programmed to perform different arithmetic, computational and logic operation at different precisions (i.e. 8-bit, 16-bit and 32-bit). This is quite different from prior art and present-day microprocessor operation where the processor has a fixed width of computation precision. It is either for example, a 32-bit processor, a 16-bit processor, or an 8-bit processor. The hardware inside a high precision processor is not fully utilized when it is programmed to perform low precision calculation. For example, the hardware for higher bits calculation in a 32-bit processor is not used when 8-bit calculation is being performed. The architecture of the execution units of the present invention additionally enables the user to trade off between high precision calculation by a given execution unit, or many different low precision calculations by the same hardware. For example, 32×32 multiplication can actually have sixteen 8×8 bit operations with similar hardware usage from the same piece of hardware, and the device can be reused for both calculations. This may be done by dividing a 32-bit input into 8-bit chunks and splitting the workout into small portions, and then combining the intermediate result in one or more steps to get the end result.

When a number of these computations are being performed, the throughput of many lower precision calculation (e.g. sixteen 8×8) and that of single higher precision calculation (e.g. one 32×32) are the same, assuming there are enough computations in the application program to load the pipeline from the beginning to the end. This is believed to be a significant advantage over prior art microprocessor operation, where the present-day microprocessor is designed only for calculation of a particular precision.

The pipeline in present-day processors, indeed, employs a fixed number of execution stages in the pipeline. In the processor of the present invention, on the other hand, there are a variable number of stages inside the execution units, depending upon what the user chooses for that unit. The present invention sets up the pipeline stages inside the execution unit with the width of the data path inside the pipeline made variable; such as 8-bit, 16-bit or 32-bit etc. The shape of the pipeline is also made variable. It can go from one corner to somewhere in the middle, into an opposite corner, traversing inside the execution units in quite a different manner, depending upon how many stages are used inside the execution unit, as contrasted with present-day microprocessor structures. In this way the data, in the operation of the present invention, feeds from outside the execution unit into an execution unit to the limit of the hardware capacity, performing many computational functions in parallel or serial inside the execution units, exiting the execution units as output, and allowing total user flexibility of whatever is desired in terms of mathematical computation. This is in contrast to present-day and prior art microprocessor execution units which are optimized by doing single or multiple fixed-precision calculations in a fixed number of execution stages.

In order for such present-day microprocessors to try to achieve computation results comparable to what the data pipeline in the present invention enables, indeed, it has been necessary to traverse the pipeline many times for parallel or serial operation on a block of input data. Present-day microprocessors thus require considerable data in and out of the execution unit through traversing a pipeline many times in response to a corresponding plurality of instructions into the execution unit, since each time the unit is traversed it requires an instruction.

That problem does not, however, exist with the present invention since once there is set up of the execution units of a particular shape, data width and number of stages for either parallel or serial operation on input data, no more new instructions need to be sent until computation on the whole block of input data is all done. Then the structure can be changed—the data width, shape and number of stages—to do a new operation. What previously had to be done with many different instructions going through the pipeline stages many different times can now be done with the present invention through just one particular pipeline structure and one small instruction sequence that corresponds to the mathematical operation or equation to be performed on all input data. This is much more efficient in terms of both data that goes in and goes through all the computation, and data that goes out at the end, so that multiple traverses are not required.

More specifically, present-day microprocessors require that the execution unit be provided with a new instruction each clock cycle, whereas with the present invention, the instructions stay within the execution unit for many different clock cycles and just the data goes in and keeps repeating. The present invention thus creates an architecture that is extremely flexible, providing a highly configurable execution unit in the processor core susceptible of being able to perform different-precision arithmetic and logic operations with the logic circuits inside the execution unit, either broken into independent units to perform parallel operations, or to be arranged as connected units to perform serial operations, or to be combined into large units to perform large operations, with this novel hierarchical structure.

This processor, as explained in said copending application, may have functional components that can perform the same computational operations as those used in current RISC processors or the like, shown as mathematical execution units $EX_1$-$EX_N$ in FIG. 3 (multipliers, adders, shifters, or pipeline multipliers, for example), and the before-mentioned memory units, such as data memory banks with associated logic circuits shown as $MU_1$-$MU_N$ in FIG. 3. These components in the programmable processor of the invention communicate with one another in a fundamentally different manner from prior RISC processors, which are fixed pipeline stage processors. As a result, such prior processors (FIGS. 1, 2A, 2B, and 2C) functional units are not efficiently utilized and become increasingly more complex and costly, unlike the previously described advantages of the flexible pipeline and programmable processor of said co-pending application and the present invention.

Instead of lining similar function units up into a pipeline, (FIGS. 2A, 2B, and 2C), the present invention utilizes the switch matrix unit 3 in FIG. 3, to provide the flexibility of connecting them to adapt or configuring them for the specific task required of the particular software application instruction sequence. The cross-connect switch 3, moreover, connects execution units $EX_1$-$EX_N$ on one side (2 in FIG. 3) and the memory units $MU_1$-$MU_N$ (4 in FIG. 3) on the other side, dynamically configuring them into different structures in accordance with the different software algorithms of the different applications.

A compiler for any specific given program based on a specific instruction sequence and hardware availability, produces machine instructions at the appropriate time sequence to configure the hardware units EXs and MUs and provides for DMA (direct memory access) to them and the connections between them, as explained in said co-pending application.

Referring now to the overall architecture of the execution units in the preferred form of the present invention, the execution unit is illustrated as having the before-mentioned hierarchal architecture—the control unit controls execution units through accessing control logic in a hierarchal format and the program RAM. Frequently used control settings can be loaded in the program RAM (FIG. 4) from a storage device, and the control unit can then use a single command (i.e. start execution at RAM location x) to control the start of the program execution in the execution unit.

The basic illustrative building blocks of the execution units EU in FIG. 4 of the present application are eight by eight (8×8) ALUs and eight by eight (8×8) multipliers. Each 8×8 ALU (or multiplier) has corresponding control logic that controls its functionality. Each eight by sixteen (8×16) unit is formed by interconnecting two 8×8 ALUs or two 8×8 multipliers together with circuit blocks dedicated for computing 8×16 multiplication results based on 8×8 multiplication results. Similarly, each 16×16 unit is formed by interconnecting two 8×16 units together with circuits dedicated for computing 16×16 multiplication result based on 8×16 multiplication results. In this fashion, the entire execution unit, of the present invention is built up, one on top of another.

The execution unit of FIG. 4 can be viewed at five different hierarchal levels: 8×8 unit, at level 1; 8×16 unit at level 2; 16×16 unit at level 3; 16×32 unit at level 4; and 32×32 unit at level 5, etc. Each unit at one level is built with two subunits at the lower level with some added circuitry, and each unit has an associated control register use to configure the operation of the unit and the connection of its subunits.

In contrast to the computation stages in today's typical processors shown in above-discussed FIGS. 1 and 2A-2C, FIG. 5 shows the highly configurable execution units of the present invention for a 3-level implementation, though the hierarchal structure architecture can be used to build execution units of many levels (e.g. 4, 5, 6, 7 . . . ), as well. FIG. 5 illustrated a generalized 3-level implementation of a 2N×2N execution unit.

It should be observed, moreover, that the output of N×2N execution unit can be connected either to the outputs of the 2 N×N execution units or to the output of the N×2N additional Computation Logic; that the output of the 2N×2N execution unit can also be connected to either the outputs of the 2N×2N Execution Units or the output of the 2N×2N Additional Computation Logic, and that the dotted oval marked 1' illustrates the data pipeline stages when the unit is configured to perform 2N×2N multiplication.

Forming N×2N and 2N×2N Execution Units

FIGS. 6 and 7 show how, in accordance with the present invention, to connect two N×N units to form an N×2N unit, and how to connect two N×2N units to form a 2N×2N unit, respectively. These methods can be used repeatedly to build up the hierarchical execution units, one level at a time. (2 8×8=>8×16; 2 8×16=>16×16; 2 16×16=>16×32; 2 16×32=>32×32; etc.)

The following Tables 1, 2, 3 and 4 are presented to illustrate suitable Input Switch Network and Output Switch Network modes of operation of the structures FIGS. 6 and 7 for configuring the execution units so as to enable the present invention to:

Perform either fewer high precision computations or more low precision computations; and To connect the output of one unit to the input of the other unit to form a data pipeline for serial computation.

In this fashion, the data pipeline inside the execution unit of the present invention can be configured to have different length, width and shape.

TABLE 1

Nx2N => NxN Input Switch Network Modes

| Mode 1 | InNx2N_A[2x-1:x] => InNxN_1_A[x-1:0]; |
| | InNx2N_A[x-1:0] => InNxN_1_B[x-1:0]; |
| | InNx2N_B[2x-1:x] => InNxN_0_A[x-1:0]; |
| | InNx2N_B[x-1:0] => InNxN_0_B[x-1:0]; |
| Mode 2 | Out_0[2x-1:x] => InNxN_1_A[x-1:0]; |
| | Out_0[x-1:0] => InNxN_1_B[x-1:0]; |
| | InNx2N_B[2x-1:x] => InNxN_2_A[x-1:0]; |
| | InNx2N_B[x-1:0] => InNxN_2_B[x-1:0]; |
| Mode 3 | InNx2N_A[2x-1:x] => InNxN_1_A[x-1:0]; |
| | InNx2N_A[x-1:0] => InNxN_1_B[x-1:0]; |
| | Out_1[2x-1:x] => InNxN_0_A[x-1:0]; |
| | Out_1[x-1:0] => InNxN_0_B[x-1:0]; |
| Mode 4 | InNx2N_A[2x-1:x] => InNxN_1_A[x-1:0]; |
| | Out_0[x-1:0] => InNxN_1_B[x-1:0]; |
| | InNx2N_B[2x-1:x] => InNxN_2_A[x-1:0]; |
| | InNx2N_B[x-1:0] => InNxN_2_B[x-1:0]; |
| Mode 5 | InNx2N_A[2x-1:x] => InNxN_1_A[x-1:0]; |
| | InNx2N_A[x-1:0] => InNxN_1_B[x-1:0]; |
| | InNx2N_B[2x-1:x] => InNxN_0_A[x-1:0]; |
| | Out_1[x-1:0] => InNxN_0_B[x-1:0]; |
| Mode 6 | InNx2N_A[2x-1:x] => InNxN_1_A[x-1:0]; |
| | InNx2N_B[2x-1:x] => InNxN_1_B[x-1:0]; |
| | InNx2N_A[x-1:0] => InNxN_0_A[x-1:0]; |
| | InNx2N_B[x-1:0] => InNxN_0_B[x-1:0]; |
| Mode 7 | InNx2N_A[2x-1:x] => InNxN_1_A[x-1:0]; |
| | InNx2N_B[2x-1:x] => InNxN_1_B[x-1:0]; |
| | InNx2N_A[x-1:0] => InNxN_0_A[x-1:0]; |
| | InNx2N_B[x-1:0] => InNxN_0_B[x-1:0]; |
| Mode 8 | InNx2N_A[2x-1:x] => InNxN_1_A[x-1:0]; |
| | InNx2N_B[x-1:0] => InNxN_1_B[x-1:0]; |
| | InNx2N_A[x-1:0] => InNxN_0_A[x-1:0]; |
| | InNx2N_B[x-1:0] => InNxN_0_B[x-1:0]; |

TABLE 2

2Nx2N => Nx2N Input Switch Network Modes
(Same as Table 1 except no Mode 7 and 8)

| Mode 1 | In2Nx2N_A[2x-1:x] => InNx2N_1_A[x-1:0]; |
| | In2Nx2N_A[x-1:0] => InNx2N_1_B[x-1:0]; |
| | In2Nx2N_B[2x-1:x] => InNx2N_0_A[x-1:0]; |
| | In2Nx2N_B[x-1:0] => InNx2N_0_B[x-1:0]; |
| Mode 2 | Out_0[2x-1:x] => InNx2N_1_A[x-1:0]; |
| | Out_0[x-1:0] => InNx2N_1_B[x-1:0]; |
| | In2Nx2N_B[2x-1:x] => InNx2N_2_A[x-1:0]; |
| | In2Nx2N_B[x-1:0] => InNx2N_2_B[x-1:0]; |
| Mode 3 | In2Nx2N_A[2x-1:x] => InNx2N_1_A[x-1:0]; |
| | In2Nx2N_A[x-1:0] => InNx2N_1_B[x-1:0]; |
| | Out_1[2x-1:x] => InNx2N_0_A[x-1:0]; |
| | Out_1[x-1:0] => InNx2N_0_B[x-1:0]; |
| Mode 4 | In2Nx2N_A[2x-1:x] => InNx2N_1_A[x-1:0]; |
| | Out_0[x-1:0] => InNx2N_1_B[x-1:0]; |
| | In2Nx2N_B[2x-1:x] => InNx2N_2_A[x-1:0]; |
| | In2Nx2N_B[x-1:0] => InNx2N_2_B[x-1:0]; |

TABLE 2-continued

2Nx2N => Nx2N Input Switch Network Modes
(Same as Table 1 except no Mode 7 and 8)

| Mode 5 | In2Nx2N_A[2x-1:x] => InNx2N_1_A[x-1:0]; |
| | In2Nx2N_A[x-1:0] => InNx2N_1_B[x-1:0]; |
| | In2Nx2N_B[2x-1:x] => InNx2N_0_A[x-1:0]; |
| | Out_1[x-1:0] => InNx2N_0_B[x-1:0]; |
| Mode 6 | In2Nx2N_A[2x-1:x] => InNx2N_1_A[x-1:0]; |
| | In2Nx2N_B[2x-1:x] => InNx2N_1_B[x-1:0]; |
| | In2Nx2N_A[x-1:0] => InNx2N_0_A[x-1:0]; |
| | In2Nx2N_B[x-1:0] => InNx2N_0_B[x-1:0]; |

TABLE 3

NxN => Nx2N Output Switch Network Modes

| Mode 1 | OutNxN_1[2x-1:x] => OutNx2N[4x-1:3x]; |
| | OutNxN_1[x-1:0] => OutNx2N[3x-1:2x]; |
| | OutNxN_0[2x-1:x] => OutNx2N[2x-1:x]; |
| | OutNxN_0[x-1:0] => OutNx2N[x-1:0]; |
| Mode 2 | OutNxN_1[2x-1:x] => OutNx2N[4x-1:3x]; |
| | OutNxN_0[2x-1:x] => OutNx2N[3x-1:2x]; |
| | OutNxN_1[x-1:0] => OutNx2N[2x-1:x]; |
| | OutNxN_0[x-1:0] => OutNx2N[x-1:0]; |
| Mode 3 | OutNxN_0[2x-1:x] => OutNx2N[4x-1:3x]; |
| | OutNxN_0[x-1:0] => OutNx2N[3x-1:2x]; |
| | OutNxN_1[2x-1:x] => OutNx2N[2x-1:x]; |
| | OutNxN_1[x-1:0] => OutNx2N[x-1:0]; |
| Mode 4 | OutNxN_0[2x-1:x] => OutNx2N[4x-1:3x]; |
| | OutNxN_0[x-1:0] => OutNx2N[3x-1:2x]; |
| | OutNxN_0[2x-1:x] => OutNx2N[2x-1:x]; |
| | OutNxN_0[x-1:0] => OutNx2N[x-1:0]; |

TABLE 4

Nx2N => 2Nx2N Output Switch Network Modes
(Same as Table 3)

| Mode 1 | OutNx2N_1[2x-1:x] => Out2Nx2N[4x-1:3x]; |
| | OutNx2N_1[x-1:0] => Out2Nx2N[3x-1:2x]; |
| | OutNx2N_0[2x-1:x] => Out2Nx2N[2x-1:x]; |
| | OutNx2N_0[x-1:0] => Out2Nx2N[x-1:0]; |
| Mode 2 | OutNx2N_1[2x-1:x] => Out2Nx2N[4x-1:3x]; |
| | OutNx2N_0[2x-1:x] => Out2Nx2N[3x-1:2x]; |
| | OutNx2N_1[x-1:0] => Out2Nx2N[2x-1:x]; |
| | OutNx2N_0[x-1:0] => Out2Nx2N[x-1:0]; |
| Mode 3 | OutNx2N_0[2x-1:x] => Out2Nx2N[4x-1:3x]; |
| | OutNx2N_0[x-1:0] => Out2Nx2N[3x-1:2x]; |
| | OutNx2N_1[2x-1:x] => Out2Nx2N[2x-1:x]; |
| | OutNx2N_1[x-1:0] => Out2Nx2N[x-1:0]; |
| Mode 4 | OutNx2N_0[2x-1:x] => Out2Nx2N[4x-1:3x]; |
| | OutNx2N_0[x-1:0] => Out2Nx2N[3x-1:2x]; |
| | OutNx2N_0[2x-1:x] => Out2Nx2N[2x-1:x]; |
| | OutNx2N_0[x-1:0] => Out2Nx2N[x-1:0]; |

The 8×8 ALU Structure

FIG. 8 shows the structure of an 8×8 ALU in typical present-day processor that has separate hardware for multiplication and addition, with result shift only possible when addition is performed. By contrast, FIG. 9 shows the structure for an 8×8 ALU with the present invention, wherein the hardware is configurable for one function or the other, such that the hardware is being used for both functions to improve hardware utilization. The functionality of the layer structure in this 8×8 ALU of the invention is described in Table 5.

TABLE 5

Functionality of the Layer Structure in 8×8 ALU

Modes

| Module | MULTIPLY | ADD, SUBTRACT, BITWISE AND, BITWISE OR, BITWISE XOR with output shifted by 0-7 bits |
|---|---|---|
| Layer 1 | output = (inputA AND inputY)>>1;<br>outputY = (inputA AND inputY)[0] | output = inputA |
| Layer 2 | output = (inputA AND inputY + inputB)>>1;<br>outputY = (inputA AND inputY)[0] | output = inputA +/AND/OR/XOR inputB |
| Layer 3 | output = (inputA AND inputY + inputB)>>1;<br>outputY = (inputA AND inputY)[0] | output = inputB>>1<br>output[7] = rightShiftIn[0]<br>rightShiftOut[0] = inputB[0]<br>if OPCODE__SR[0] = 1 and SR[0]=1;<br>output = inputB otherwise. |
| Layer 4 | output = (inputA AND inputY + inputB)>>1;<br>outputY = (inputA AND inputY)[0] | output = inputB>>2<br>output[7:6] = rightShiftIn[2:1]<br>rightShiftOut[2:1] = inputB[1:0]<br>if OPCODE__SR[0] = 1 and SR[1]=1;<br>output = inputB otherwise. |
| Layer 5 | output = (inputA AND inputY + inputB)>>1;<br>outputY = (inputA AND inputY)[0] | output = inputB>>4<br>output[7:4] = rightShiftIn[6:3]<br>rightShiftOut[6:3] = inputB[3:0]<br>if OPCODE__SR[0] = 1 and SR[2]=1;<br>output = inputB otherwise. |
| Layer 6 | output = (inputA AND inputY + inputB)>>1;<br>outputY = (inputA AND inputY)[0] | output = inputB<<1<br>output[0] = leftShiftIn[0]<br>leftShiftOut[0] = inputB[7]<br>if OPCODE__SR[0] = 0 and SR[0]=1;<br>output = inputB otherwise. |
| Layer 7 | output = (inputA AND inputY + inputB)>>1;<br>outputY = (inputA AND inputY)[0] | output = inputB<<2<br>output[1:0] = leftShiftIn[2:1]<br>leftShiftOut[2:1] = inputB[7:6]<br>if OPCODE__SR[0] = 0 and SR[1]=1;<br>output = inputB otherwise. |
| Layer 8 | output = (inputA AND inputY + inputB)>>1;<br>outputY = (inputA AND inputY)[0] | output = inputB<<4<br>output[3:0] = leftShiftIn[6:3]<br>leftShiftOut[6:3] = inputB[7:4]<br>if OPCODE__SR[0] = 0 and SR[2]=1;<br>output = inputB otherwise. |

Present-Day Barrel Type Bit Shifting

The flow diagrams of FIGS. 10 and 11 show respectively the structures of today's traditional barrel shifters with rotate capability. Since a 16-bit shifter has 4 right layers and 4 left layers of 16-bit multiplexing (FIG. 11), while an 8-bit shifter has 3 right layers and 3 left layers of 8-bit multiplexing, (FIG. 10), separate hardware blocks are needed for 8-bit and 16-bit shifters if shifting of both are required in a present-day processor.

The Novel Bit Shifting of the Invention

Unlike prior processing, the invention further provides combining of 8-bit shift/rotate structures to form 16-bit ones, and novel combining 16-bit shift/rotate structures to form 32-bit ones, etc., to create higher-bit shift/rotate structures. These structure can also be configured to perform either low-bit shift/rotate or high-bit shift/rotate based on the desired application program.

There are three steps involved in creating such novel structures.

Step 1: Use a traditional barrel shift (shift only, no rotate) as shown in FIG. 12, with the bits shifted out as outputs of the module.

Step 2: Create 8-bit shift rotate structure as shown in FIG. 13.

Step 3: Connect two 8-bit shift/rotate structure to form a 16-bit shift/rotate structure as shown in FIG. 14. Use such method repeatedly to form higher-bit shift/rotate structures.

An illustrative and preferred data pipeline structure of the invention involves executing units comprising a total of $2^n$ 8×8 ALUs and/or 8×8 multipliers, with each 8×8 ALU or 8×8 multiplier having a corresponding control register that controls its functionality; and each 8×16 unit is formed by interconnecting two 8×8 ALUs or two 8×8 multipliers together with circuit blocks dedicated for computing 8×16 multiplication results based on 8×8 multiplication results. 16×16 units are formed by interconnecting two 8×16 units together with circuit blocks dedicated for computing 16×16 multiplication results based on 8×16 multiplication results, such that the entire execution unit is built up one level on top of another with a total of (n+1) levels to form $(8*2^{n/2}) \times (8*2^{n/2})$ unit when n is even or $(8*2^{(n-1)/2}) \times (8*2^{(n+1)/2})$ unit when n is odd.

The 8×8 ALU structure comprises eight layers of circuitry that are programmed to perform one of the following two functions in a single clock cycle—

Arithmetic addition, subtract, or logic operation with the result shifted or rotated to the left or right by 0-7 bits with each layer performing the following operation—
  Layer 1: No operation
  Layer 2: Arithmetic addition, subtract, bitwise logic operation, or no operation depending on configuration
  Layer 3: Left shift by 1 bit, or no operation depending on configuration
  Layer 4: Left shift by 2 bit, or no operation depending on configuration Layer 5: Left shift by 4 bit, or no operation depending on configuration
Layer 6: Right shift by 1 bit, or no operation depending on configuration
Layer 7: Right shift by 2 bit, or no operation depending on configuration
Layer 8: Right shift by 4 bit, or no operation depending on configuration
8-bit by 8-bit multiplication with each layer performing the following operation—
Layer 1: Bitwise logic AND of an 8-bit input with an 1-bit input
Each layer in layers 2-8: A bitwise logic AND of an 8-bit input with an 1-bit input, followed with an 8-bit addition, followed with a 1-bit right which, all of which completes one of repeated step in a 8-bit by 8-bit multiplication.

In this data pipeline structure, each execution unit employs a hierarchical structure for performing shift or rotate; (FIGS. 13 and 14) and each 16-bit shift/rotate structure in the 8×16 ALU is formed by interconnecting two 8-bit shift/rotate structures in the 8×8 ALUs together with additional multiplexers; and each 32-bit shift/rotate structure in the 16×16 ALU is formed by interconnecting two 16-bit shift/rotate structures in the 8×16 ALUs together with additional multiplexers, such that the entire structure for shift or rotate is built up one level on top of another to form 8 n-bit shifter with n 8×8 ALUs.

Further modifications will occur to those skilled in the art, and such are considered to fall within the spirit and scope of the invention as defined in the appended claims.

What is claimed is:

1. A flexible data pipeline architecture for accommodating software computational instructions for varying application programs, comprising:
a programmable embedded processor having a plurality of pipeline stages, at least some of the pipeline stages being mathematical execution units and at least some of the pipeline stages being memory units; and
an interconnecting switch matrix, each of the pipeline stages having a direct connection to the interconnecting switch matrix, the interconnecting switch matrix being able to form direct interconnections between the pipeline stages, the direct interconnections between the pipeline stages being variable in response to varying application instruction sequences as fast as every clock cycle so as to interconnect the pipeline stages in any desired number and in any desired order,
wherein each of the execution units includes a plurality of logic circuits, the logic circuits being interconnectable into different hierarchical architecture structures so as to perform operations at different precisions of multi-bit arithmetic and logic operations, and
wherein each of the execution units includes a program RAM into which control settings can be loaded for configuration of the logic circuits into different hierarchical architecture structures in the execution unit.

2. The data pipeline structure of claim 1 wherein the logic circuits can be configured each clock cycle into different hierarchical architecture structures so as to perform operations at different precisions of multi-bit arithmetic and logic operations.

3. The data pipeline structure of claim 2 wherein the mathematical execution units are programmed at run time to perform 8-bit, 16-bit, 32-bit and/or other multiples of 8-bit arithmetic and logic operations, and depending on the operation being performed, the logic circuits inside the execution units are configured each clock cycle based on an instruction sequence either to be broken into independent units to perform parallel operations, or to be arranged as connected units to perform serial operations, or to be combined into larger units to perform larger operations, or to perform a mixture of operations in the hierarchical structure.

4. The data pipeline structure of claim 3 wherein each executing unit comprises a total of $2^n$ 8×8 ALUs and/or 8×8 multipliers, and with each 8×8 ALU or 8×8 multiplier having a corresponding control register that controls its functionality; and each 8×16 unit is formed by interconnecting two 8×8 ALUs or two 8×8 multipliers together with circuit blocks dedicated for computing 8×16 multiplication results based on 8×8 multiplication results; and each 16×16 unit is formed by interconnecting two 8×16 units together with circuit blocks dedicated for computing 16×16 multiplication results based on 8×16 multiplication results, such that the entire execution unit is built up, one level on top of another, with a total of (n+1) levels to form $(8*2^{n/2}) \times (8*2^{n/2})$ unit when n is even or $(8*2^{(n-1)/2}) \times (8*2^{(n+1)/2})$ unit when n is odd.

5. The data pipeline structure of claim 4, wherein the 8×8 ALU comprises eight layers of circuitry that are programmed to perform at least one of the following two functions in a single clock cycle—
Arithmetic addition, subtraction, or logic operation with the result shifted or rotated to the left or right by 0-7 bits, and with each layer performing the following operation—
Layer 1: No operation
Layer 2: Arithmetic addition, subtract, bitwise logic operation, or no operation depending on configuration
Layer 3: Left shift by 1 bit, or no operation depending on configuration
Layer 4: Left shift by 2 bit, or no operation depending on configuration
Layer 5: Left shift by 4 bit, or no operation depending on configuration
Layer 6: Right shift by 1 bit, or no operation depending on configuration
Layer 7: Right shift by 2 bit, or no operation depending on configuration
Layer 8: Right shift by 4 bit, or no operation depending on configuration
8-bit by 8-bit multiplication with each layer performing the following operation—
Layer 1: Bitwise logic AND of an 8-bit input with a 1-bit input
Each layer in layers 2-8: A bitwise logic AND of an 8-bit input with an 1-bit input, followed with an 8-bit addition, followed with a 1-bit right which, all of which completes one of repeated step in an 8-bit by 8-bit multiplication.

6. The data pipeline structure of claim 4 wherein each execution unit employs a hierarchical structure for performing shift or rotate; and each 16 bit shift/rotate structure in the 8×16 ALU is formed by interconnecting two 8-bit shift/rotate structures in the 8×8 ALUs together with additional multiplexers; and each 32-bit shift/rotate structure in the 16×16 ALU is formed by interconnecting two 16-bit shift/rotate structures in the 8×16 ALUs together with additional multiplexers, such that the entire structure for shift or rotate is built up one level on top of another to form 8n-bit shifter with n 8×8 ALUs.

7. The data pipeline structure of claim 4, wherein the overall execution unit comprises multiple hierarchical levels and with each unit at one level being built with two sub units at the lower level and added circuitry.

8. The data pipeline architecture of claim 1, wherein:
each execution unit includes a plurality of logic circuits which are operable with a bit precision of n×n, n being a power of 2, n not necessarily having the same value for all of the execution units; and
the logic circuits within each execution unit are interconnectable so as to perform operations at a desired precision of multi-bit arithmetic and logic operations by connecting pairs of logic circuits so as to form a first collection of interconnected groups of logic circuits operating with a 2n×n bit precision, connecting pairs of interconnected groups within the first collection so as to form a second collection of interconnected groups of logic circuits operating with a 2n×2n bit precision, and if necessary successively continuing to connect pairs of interconnected groups of logic circuits to form interconnected groups operating at higher bit precisions until at least one interconnected group of logic circuits is formed which can perform operations at the desired precision of multi-bit arithmetic and logic operations.

9. A programmable embedded processor with internal pipeline stages, at least some of the pipeline stages being mathematical execution units and at least some of the pipeline stages being memory units; and
an interconnecting switch matrix, each of the pipeline stages having a direct connection to the interconnecting switch matrix, the interconnecting switch matrix being able to form direct interconnections between the pipeline stages, the direct interconnections between the pipeline stages being variable in response to varying application instruction sequences as fast as every clock cycle so as to interconnect the pipeline stages in any desired number and in any desired order,
wherein each of the execution units includes a plurality of logic circuits, the logic circuits being interconnectable into different hierarchical architecture structures so as to perform operations at different precisions of multi-bit arithmetic and logic operations, and
wherein each of the execution units includes a program RAM into which control settings can be loaded for configuration of the logic circuits into different hierarchical architecture structures in the execution unit.

10. The processor of claim 9 wherein the logic circuits can be configured each clock cycle into different hierarchical architecture structures so as to perform operations at different precisions of multi-bit arithmetic and logic operations.

11. The processor structure of claim 9 wherein the mathematical execution units are programmed at run time to perform 8-bit, 16-bit, 32-bit and/or other multiple of 8-bit arithmetic and logic operations, and depending on the operation being performed, the logic circuits inside the execution units are configured each clock cycle based on an instruction sequence either to be broken into independent units to perform parallel operations, or to be arranged as connected units to perform serial operations, or to be combined into larger unit(s) to perform larger operation in the hierarchical structure.

12. The processor structure of claim 11 wherein each executing unit comprises total of $2^n$ 8×8 ALUs and/or 8×8 multipliers, with each 8×8 ALU or 8×8 multiplier having a corresponding control register that controls its functionality; and each 8×16 unit is formed by interconnecting two 8×8 ALUs or two 8×8 multipliers together with circuit blocks dedicated for computing 8×16 multiplication results based on 8×8 multiplication results; and each 16×16 unit is formed by interconnecting two 8×16 units together with circuit blocks dedicated for computing 16×16 multiplication results based on 8×16 multiplication results, such that the entire execution unit is built up one level on top of another with a total of (n+1) levels to form $(8*2^{n/2}) \times (8*2^{n/2})$ unit when n is even or $(8*2^{(n-1)/2}) \times (8*2^{(n+1)/2})$ unit when n is odd.

13. The processor structure of claim 12, wherein the 8×8 ALU comprises eight layers of circuitry that are programmed to perform at least one of the following two functions in a single clock cycle—
Arithmetic addition, subtract, or logic operation with the result shifted or rotated to the left or right by 0-7 bits with each layer performing the following operation
Layer 1: No operation
Layer 2: Arithmetic addition, subtract, bitwise logic operation, or no operation depending on configuration
Layer 3: Left shift by 1 bit, or no operation depending on configuration
Layer 4: Left shift by 2 bit, or no operation depending on configuration
Layer 5: Left shift by 4 bit, or no operation depending on configuration
Layer 6: Right shift by 1 bit, or no operation depending on configuration
Layer 7: Right shift by 2 bit, or no operation depending on configuration
Layer 8: Right shift by 4 bit, or no operation depending on configuration
8-bit by 8-bit multiplication with each layer performing the following operation—
Layer 1: Bitwise logic AND of an 8-bit input with an 1-bit input
Each layer in layers 2-8: A bitwise logic AND of an 8-bit input with an 1-bit input, followed with an 8-bit addition, followed with a 1-bit right which, all of which completes one of repeated step in a 8-bit by 8-bit multiplication.

14. The processor structure of claim 12 wherein each execution unit employees a hierarchical structure for performing shift or rotate; and each 16-bit shift/rotate structure in the 8×16 ALU is formed by interconnecting two 8-bit shift/rotate structures in the 8×8 ALUs together with additional multiplexers; and each 32-bit shift/rotate structure in the 16×16 ALU is formed by interconnecting two 16-bit shift/rotate structures in the 8×16 ALUs together with additional multiplexers, such that the entire structure for shift or rotate is built up one level on top of another to form 8n-bit shifter with n 8×8 ALUs.

15. The data processor structure of claim 12, wherein the overall execution unit comprises multiple hierarchical levels and with each unit at one level being built with two sub units at the lower level and added circuitry.

16. The processor of claim 9, wherein:
each execution unit includes a plurality of logic circuits which are operable with a bit precision of n×n, n being a power of 2, n not necessarily having the same value for all of the execution units; and
the logic circuits within each execution unit are interconnectable so as to perform operations at a desired precision of multi-bit arithmetic and logic operations by connecting pairs of logic circuits so as to form a first collection of interconnected groups of logic circuits operating with a 2n×n bit precision, connecting pairs of interconnected groups within the first collection so as to form a second collection of interconnected groups of logic circuits operating with a 2n×2n bit precision, and if necessary successively continuing to connect pairs of interconnected groups of logic circuits to form interconnected groups operating at higher bit precisions until at least one interconnected group of logic circuits is formed which can perform operations at the desired precision of multi-bit arithmetic and logic operations.

17. A flexible data pipelining method accommodating software algorithms for varying application programs, the method comprising:
programming an embedded data processor with internal pipeline stages, at least some of the pipeline stages being mathematical execution units and at least some of the pipeline stages being memory units, each of the execution units including a plurality of logic circuits, each of the execution units including a program RAM into which control settings can be loaded for interconnecting of the logic circuits into different hierarchical architecture structures in the execution unit, each of the pipeline stages having a direct connection to an interconnecting switch matrix;
forming direct interconnections between the pipeline stages, the direct interconnections between the pipeline stages being formed by the matrix switch and being variable in response to varying application instruction sequences as fast as every clock cycle so as to interconnect the pipeline stages in any desired number and in any desired order;
loading control settings into the program RAM of the execution units so as to interconnect the logic circuits into different hierarchical architecture structures which cause the execution units to perform at different precisions of multi-bit arithmetic and logic operations; and
configuring the memory units to perform memory read and memory write in desired memory addressing modes, and in a multi-level hierarchical fashion.

18. The method of claim 17 wherein the logic circuits can be configured each clock cycle into different hierarchical architecture structures so as to perform operations at different precisions of multi-bit arithmetic and logic operations.

19. The method of claim 17 wherein the mathematical execution units are programmed at run time to perform 8-bit, 16-bit, 32-bit and/or other multiple of 8-bit arithmetic and logic operations; and, depending on the operation being performed, the logic circuits within the execution units are configured each clock cycle based on an instruction sequence either to be broken into independent units to perform parallel operations, or to be arranged as connected units to perform serial operations, or to be combined into larger unites) to perform larger operation in the hierarchical structure.

20. The method of claim 19 wherein each executing unit comprises total of $2^n$ 8×8 ALUs and/or eight 8×8 multipliers, with each 8×8 ALU or 8×8 multiplier having a corresponding control register that controls its functionality; and each 8×16 unit is formed by interconnecting two 8×8 ALUs or two 8×8 multipliers together with circuit blocks dedicated for computing 8×16 multiplication results based on 8×8 multiplication results; and each 16×16 unit is formed by interconnecting two 8×16 units together with circuit blocks dedicated for computing 16×16 multiplication results based on 8×16 multiplication results, such that the entire execution unit is built up one level on top of another, with a total of (n+1) levels to form $(8*2^{n/2}) \times (8*2^{n/2})$ unit when n is even or $(8*2^{(n-1)/2}) \times (8*2^{(n+1)/2})$ unit when n is odd.

21. The method of claim 20, wherein the 8×8 ALU comprises eight layers of circuitries that are programmed to perform one of the following two functions in a single clock cycle—
Arithmetic addition, subtract, or logic operation with the result shifted or rotated to the left or right by 0-7 bits with each layer performing the following operation—
Layer 1: No operation
Layer 2: Arithmetic addition, subtract, bitwise logic operation, or no operation depending on configuration
Layer 3: Left shift by 1 bit, or no operation depending on configuration
Layer 4: Left shift by 2 bit, or no operation depending on configuration
Layer 5: Left shift by 4 bit, or no operation depending on configuration
Layer 6: Right shift by 1 bit, or no operation depending on configuration
Layer 7: Right shift by 2 bit, or no operation depending on configuration
Layer 8: Right shift by 4 bit, or no operation depending on configuration
8-bit by 8-bit multiplication with each layer performing the following operation—
Layer 1: Bitwise logic AND of an 8-bit input with an 1-bit input
Each layer in layers 2-8: A bitwise logic AND of an 8-bit input with an 1-bit input, followed with an 8-bit addition, followed with a 1-bit right which, all of which completes one of repeated step in a 8-bit by 8-bit multiplication.

22. The method of claim 20 wherein each execution unit employs a hierarchical structure for performing shift or rotate; and each 16-bit shift/rotate structure in the 8×16 ALU is formed by interconnecting two 8-bit shift/rotate structures in the 8×8 ALUs together with additional multiplexers; and each 32-bit shift/rotate structure in the 16×16 ALU is formed by interconnecting two 16-bit shift/rotate structures in the 8×16 ALUs together with additional multiplexers, such that the entire structure for shift or rotate is built up one level on top of another to form 8n-bit shifter with n 8×8 ALUs.

23. The method of claim 20, wherein the overall execution unit comprises multiple hierarchical levels and with each unit at one level being built with two sub units at the lower level and added circuitry.

24. The method of claim 17, wherein:
each execution unit includes a plurality of logic circuits which are operable with a bit precision of n×n, n being a power of 2, n not necessarily having the same value for all of the execution units; and
loading control settings into the program RAM of the execution units so as to interconnect the logic circuits into different hierarchical architecture so as to perform operations at a desired precision of multi-bit arithmetic and logic operations includes:
connecting pairs of logic circuits so as to form a first collection of interconnected groups of logic circuits operating with a 2n×n bit precision;
connecting pairs of interconnected groups within the first collection so as to form a second collection of interconnected groups of logic circuits operating with a 2n×2n bit precision; and
if necessary, successively continuing to connect pairs of interconnected groups of logic circuits to form interconnected groups operating at higher bit precisions until at least one interconnected group of logic circuits is formed which can perform operations at the desired precision of multi-bit arithmetic and logic operations.

* * * * *